United States Patent
Salin et al.

(10) Patent No.: US 6,370,390 B1
(45) Date of Patent: Apr. 9, 2002

(54) DELIVERY OF SHORT MESSAGES IN A PACKET RADIO NETWORK

(75) Inventors: Hannu-Pekka Salin, Vantaa; Serge Haumont, Helsinki, both of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/194,652
(22) PCT Filed: Apr. 1, 1998
(86) PCT No.: PCT/FI98/00294
  § 371 Date: Dec. 1, 1998
  § 102(e) Date: Dec. 1, 1998
(87) PCT Pub. No.: WO98/44640
  PCT Pub. Date: Oct. 8, 1998

(30) Foreign Application Priority Data

Apr. 3, 1997 (FI) .................................................. 971381

(51) Int. Cl.[7] .............................................. H04Q 7/20
(52) U.S. Cl. ........................ 455/466; 455/426; 455/433; 455/445; 455/448
(58) Field of Search ................................. 455/403, 414, 455/422, 426–432, 433–436, 445, 448–461, 465, 466

(56) References Cited

U.S. PATENT DOCUMENTS 5,537,415 A * 7/1996 Miller et al. ................ 370/314
5,577,102 A * 11/1996 Koivunen .................... 455/433

(List continued on next page.)

FOREIGN PATENT DOCUMENTS

| | | |
|---|---|---|
| FI | 92364 | 7/1994 |
| GB | 2 244 409 | 11/1991 |
| WO | WO 93/26131 | 12/1993 |
| WO | WO 94/16532 | 7/1994 |
| WO | WO 95/12292 | 5/1995 |
| WO | WO 96/03843 | 2/1996 |

OTHER PUBLICATIONS

Copy of International Search Report for PCT/FI98/00294.
1992, Mouly, et al., The GSM System for Mobile Communications, pp. 7–699.
1997, GSM Technical Specification, Digital cellular telecommunications System (Phase 2+); General Packet Radio Service (GPRS); Service Description; Stage 2; (GSM 03.60), pp. 1–73.

Primary Examiner—Tracy Legree
Assistant Examiner—Ray Persino
(74) Attorney, Agent, or Firm—Altera Law Group, LLC

(57) ABSTRACT

The invention relates to delivery of short messages to mobile stations and particularly to delivery of short messages in mobility-supporting packet radio networks that use a mobile communications network as an access network, to a dual-mode mobile station in a situation where the mobile station is not reachable in the packet radio network. The object of the invention is to minimize unnecessary signalling. The invention is based on the fact that parameters controlling the network elements are inserted into the signalling messages and a flag indicating the state of the mobile station is inserted into the home location register. The method and radio network of the invention, the signalling messages may contain parameters by means of which 1) delivery of a short message through the secondary network is prevented, 2) information on the fact that an attempt was made to reach the mobile station but the attempt was not successful is sent to the node of the secondary network, 3) the node of the secondary network is prevented from informing the home location register of the mobile station of the attach of the mobile station to the network, 4) information is sent to the home location register on the fact that the mobile station cannot be reached through the primary network, and 5) information is sent to the gateway mobile switching center for short message service on the fact that the mobile station can be reached through the primary network even though the short message was delivered through the secondary network.

19 Claims, 5 Drawing Sheets

U.S. PATENT DOCUMENTS

| | | | | |
|---|---|---|---|---|
| 5,768,509 A | * | 6/1998 | Gunluk | 455/428 |
| 5,915,222 A | * | 6/1999 | Olsson et al. | 455/466 |
| 5,946,629 A | * | 8/1999 | Sawyer et al. | 455/466 |
| 5,946,630 A | * | 8/1999 | Willars et al. | 455/466 |
| 6,032,044 A | * | 2/2000 | Shannon et al. | 455/433 |
| 6,047,194 A | * | 4/2000 | Anderson | 455/466 |
| 6,097,962 A | * | 8/2000 | Corriveau et al. | 455/466 |

* cited by examiner

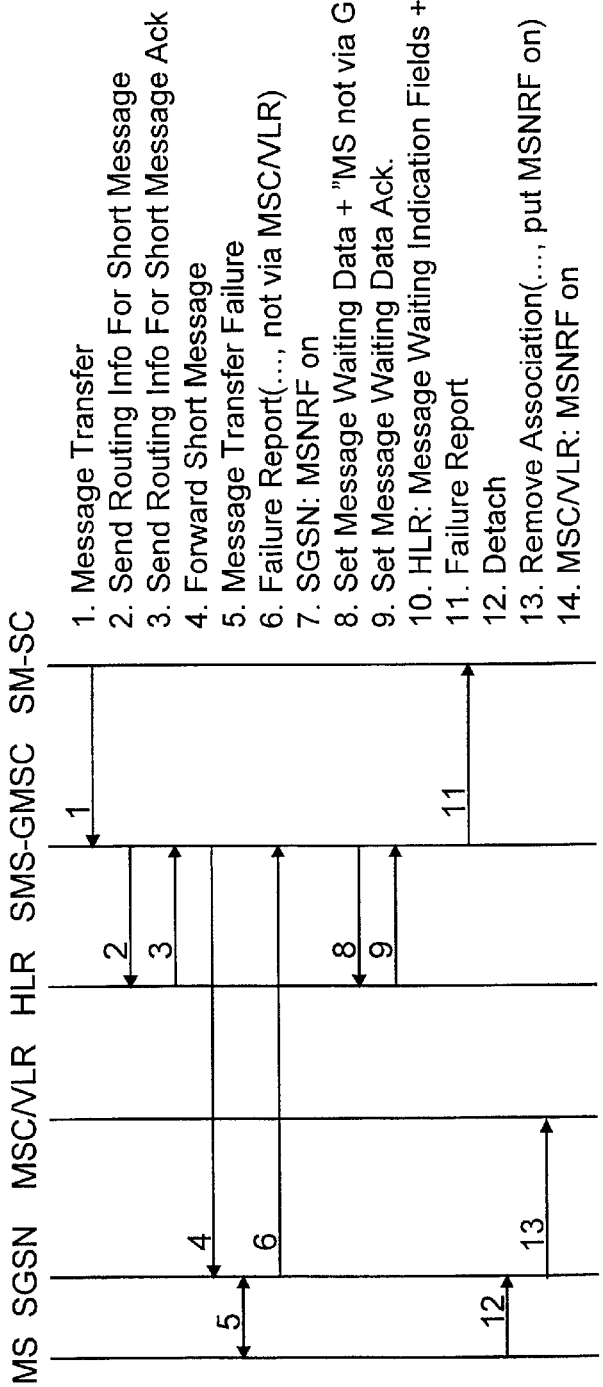

FIG. 3

1. Message Transfer
2. Send Routing Info For Short Message
3. Send Routing Info For Short Message Ack
4. Forward Short Message
5. Message Transfer Failure
6. Failure Report(..., not via MSC/VLR)
7. SGSN: MSNRF on
8. Set Message Waiting Data + "MS not via GPRS"
9. Set Message Waiting Data Ack.
10. HLR: Message Waiting Indication Fields + flag "MS not GPRS"
11. Failure Report
12. Detach
13. Remove Association(..., put MSNRF on)
14. MSC/VLR: MSNRF on

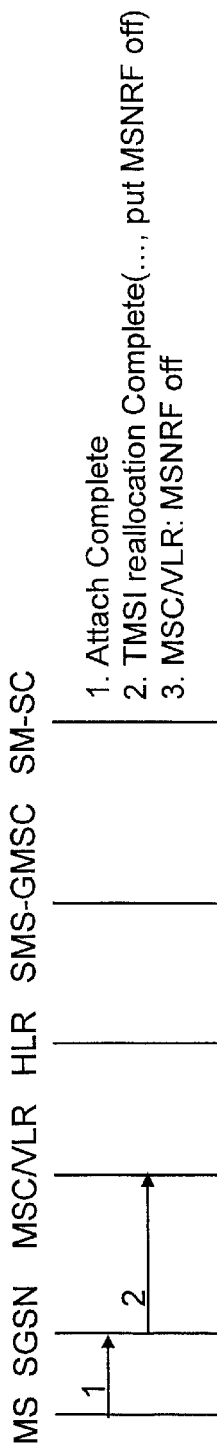

FIG. 4

1. Attach Complete
2. TMSI reallocation Complete(..., put MSNRF off)
3. MSC/VLR: MSNRF off

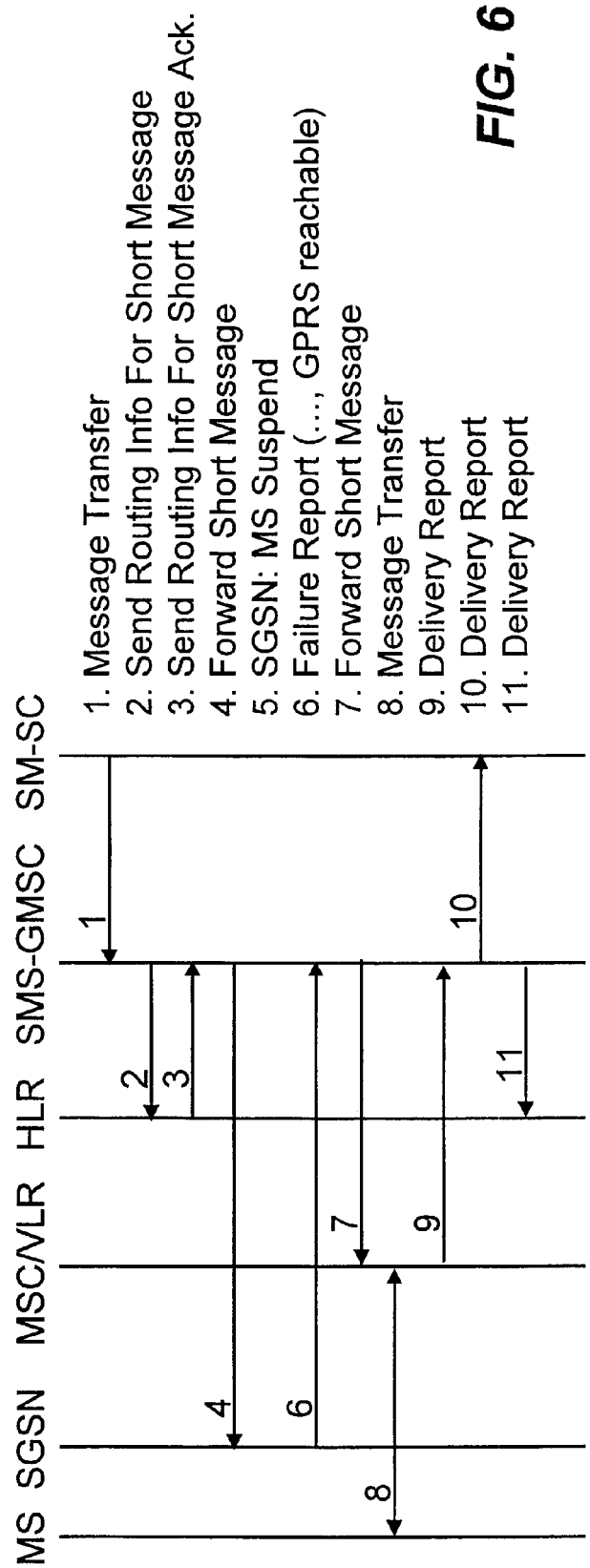

DELIVERY OF SHORT MESSAGES IN A PACKET RADIO NETWORK

BACKGROUND OF THE INVENTION

The present invention relates to delivery of short messages to mobile stations and particularly to delivery of short messages in mobility-supporting packet radio networks that use a mobile communications network as an access network, to a dual-mode mobile station in a situation where the mobile station is not reachable in the packet radio network.

Mobile communications systems have been developed because there has been a need to free people to move away from fixed telephone terminals without impairing their availability. Simultaneously with the increase in the use of various data transfer services at offices, various data services have also been introduced in mobile communications systems. Lap-top computers make efficient data processing possible everywhere the user moves. Mobile communications networks offer to the user an efficient access network for mobile data transfer, thus providing access to the actual data networks. For this purpose, various new forms of data service for the present and future mobile networks are being planned. Digital mobile communications systems, such as the pan-European mobile communications system GSM (Global System for Mobile Communications), support mobile data transfer particularly well.

The General Packet Radio Service GPRS is a new service in the GSM system, and it is one of the topics of GSM Phase 2+standardization work at ETSI (European Telecommunications Standards Institute). The GPRS operating environment comprises one or more subnetwork service areas that are interconnected by a GPRS backbone network. The subnetwork comprises a number of packet data service nodes SN, termed serving GPRS support nodes (SGSN) herein, each being connected to a GSM mobile communications network (typically base station systems) so as to be able to offer a packet data service to mobile data terminal equipment via several base stations, i.e. cells. The intermediary mobile communications network offers packet-switched data transfer between the support node and the mobile data terminals. The different subnetworks for their part are connected to an external data network, e.g. a public switched data network PSPDN, via specific GPRS gateway support nodes GGSN. Hence, the GPRS service allows packet data transfer between mobile data terminals and external data networks, the GSM network serving as an access network. The GPRS network architecture is illustrated in FIG. 1.

One kind of service of mobile communications networks is short message service (SMS). This differs from voice and data services in that to send a short message, no connection from the sending party to the receiving party need to be established, as the short messages are transmitted in the form of signalling messages. Data transfer by means of short messages is limited to one message only. Short message services are asymmetric, and the transmission of a mobile-originated short message is considered a different service from the transmission of a mobile-terminated short message. In a GSM network, short messages can be received and sent even during an ongoing call, as short messages are relayed on control channels. A short message service center SM-SC is an entity delivering short messages and storing and retransmitting short messages the delivery of which has failed. All short messages pass through a short message service center SM-SC. A short message service center can receive a short message through any network for delivery to a mobile station MS. The short message service center SM-SC transfers the short message it received to a gateway mobile switching center for short message service (SMS-GMSC) for further delivery to a mobile station. An incoming short message from a mobile station is transmitted via an interworking mobile switching center for short message service (SMS-IWMSC) to a short message service center for further delivery. To provide short message service, a GPRS network has a serving GPRS support node SGSN connected to a gateway mobile switching center for short message service, SMS-GMSC, and to an interworking mobile switching center for short message service, SMS-IWMSC. Through these, a mobile station MS attached to a GPRS network can send and receive short messages on the radio channels of the GPRS.

The mobility management (MM) activities related to a GPRS subscriber are characterized by one three different MM states of the mobile station MS: Idle State, Standby State, and Ready State. Each state describes a certain level of functionality and information allocated to the mobile station MS and to the serving GPRS support node SGSN. The information sets relating to these states, which are maintained in the serving GPRS support node SGSN and in the mobile station MS, are denoted MM contexts. The context of the serving GPRS support node SGSN comprises subscriber data, such as the subscriber IMSI, TLLI, and location or routing data, etc.

In the idle state, the mobile station MS is not reachable from the point of view of the GPRS network, and the network holds no current state, location, or routing information for the mobile station MS, i.e. no MM context. If the mobile station MS is of dual mode, i.e. is capable of operating in GPRS and GSM networks, it may be in the GSM network when being in GPRS-Idle state. The mobile station MS can move from idle state to ready state by attach to the GPRS network, and from standby state or ready state to idle state by detach from the GPRS network.

In the standby and ready states, the mobile station MS is attached to the GPRS network. The ready state is the actual data transfer state in which the MS is capable of transmitting and receiving user data. The MS passes from standby state to ready state either when the GPRS network pages the mobile station or when the mobile station MS starts data transfer or signalling. The mobile station MS may remain in the ready state (for a time-out preset in a timer) even when no user data is transferred or no signalling takes place. If the mobile station is a 'dual mode' mobile station and is in standby state or ready state, the paging required by circuit-switched services, e.g. a voice call to be made to the mobile station, is made through the serving support node SGSN of the GPRS network. In other words, the GSM paging is carried out as GPRS paging.

When a short message service center SM-SC receives a short message SM for delivery to a mobile station MS, the short message service center forwards it to a gateway mobile switching center for short message service, SMS-GMSC, which examines the destination MS address and requests routing information from the relevant home location register HLR. The home location register HLR of the GSM network also contains the GPRS subscriber data and routing information. The home location register HLR sends in its message the serving GPRS support node (SGSN) address of the mobile station MS or the VLR address at the mobile services switching center MSC, or both. If the HLR message contains only the MSC/VLR address, the short message is delivered normally through the GSM network. If the HLR message contains an SGSN address, the gateway mobile switching center for short message service, SMS-GMSC, forwards the short message SM to the serving GPRS support node SGSN. If the mobile station MS is attached to the network and is reachable, the serving GPRS support node SGSN transfers the short message SM to the mobile station MS.

However, the serving support node SGSN may not be able to deliver the short message SM to the mobile station MS on account of for instance the fact that the radio channel conditions are poor or the mobile station MS is detached from the GPRS network, i.e. is in idle state. The HLR is not aware of the state of the mobile station, it only knows the addresses. When the serving support node SGSN does not succeed in delivering the short message to the mobile station, the serving support node SGSN sets a flag MSNRF (=Mobile Subscriber Not Reachable Flag) indicating that the mobile station is not reachable, and sends a failure report to the SMS-GMSC.

If the routing information received from the home location register HLR does not include the MSC/VLR address, the SMS-GMSC sends to the home location register HLR a message indicating that there is a message waiting, deletes the message from its buffer, and returns a failure report to the short message service center SM-SC. The HLR updates in its registers the fields indicating that there is a short message awaiting this mobile station. If a new short message for the same mobile station arrives before the mobile station again becomes attached to the network, an attempt is made to deliver the new short message because the HLR does not know that the mobile station is not reachable. In this way, unnecessary signalling is created in the network, yet the short message cannot be delivered.

If in addition to the address of the serving support node SGSN the address of the mobile services switching center MSC/VLR was received from the home location register HLR, the gateway mobile switching center for short message service, SMS-GMSC, sends the short message SM to the mobile services switching center MSC/VLR, since the short message SM could not be delivered through the service GPRS support node SGSN.

When the mobile station is attached to both networks, the GSM paging request for the mobile station MS is sent through the serving GPRS support node SGSN. If the short message SM could not be delivered to the mobile station MS through the serving GPRS support node SGSN because the mobile station attached to the network was not reachable, i.e. did not respond to the paging request, the short message cannot be delivered through the mobile services switching center MSC/VLR either, since the mobile station MS is paged through the serving support node SGSN. On account of the failed paging, the visitor location register MSC/VLR sets a flag, Mobile Subscriber Not Reachable Flag (MSNRF), returns a failure report to the gateway mobile switching center for short message service, SMS-GMSC, which again requests the home location register HLR to update in its registers the fields indicating that a short message is awaiting this mobile station. Now an indication of the fact that the mobile station could not be reached is held in three locations. Furthermore, there is unnecessary signalling between the mobile services switching center MSC/VLR and the serving support node SGSN in connection with the paging, as the outcome is obvious.

When the mobile station again becomes reachable in the GPRS network, the SGSN sends to the home location register information on the fact that the mobile station MS is available. The same information is sent to the home location register by the MSC/VLR when the mobile station becomes reachable in the GSM network. The information sent by either the SGSN or the MSC/VLR is fully unnecessary, as the first information received by the home location register will initiate retransmission of the short message using the above routine. If the mobile station becomes reachable in the GSM network first, the GPRS is unnecessarily requested to deliver the short message first.

The above problems will also arise if the network has just recently detached the mobile station MS, i.e. transferred it to idle state, on account of the fact that the GPRS network cannot reach the mobile station, i.e. the mobile station does not respond to a paging request, for example. However, the mobile station MS considers itself as being attached to the GPRS network. In that situation, the mobile services switching center MSC/VLR attempts to contact the mobile station on the paging channel of the GSM network, but since the mobile station is still listening to the paging channel of the GPRS network, it does not detect the paging message from the other channel. The page signalling of the mobile services switching center MSC/VLR is unnecessary, since the outcome is foreseen. The short message cannot be delivered, and information about failure will produce an indication thereof in three locations, thus creating unnecessary signalling between the home location register and the respective network node.

If the mobile station MS was in idle state when an attempt was made to send the short message SM through the GPRS network, sending of the short message SM through the GSM network may be successful. The flag MSNRF will remain set in the serving network node SGSN, even though it were possible to deliver the short message SM (independently of whether the MSC/VLR was successful in delivering the short message or not). In consequence, when the MS again becomes attached to the GPRS network, the SGSN sends to the home location register a notification of this (Note MS Present) even if no short message is waiting. If the transmission of the short message SM fails, the visitor location register VLR sets a flag MSNRF and sends a report on failure of the delivery of the short message to the SMS-GMSC. Hence information is held in three locations on the fact that the mobile station could not be reached, and this will produce unnecessary signalling as stated above.

In particular, when the mobile station MS is in idle state a problem is presented by the fact that the home location register HLR only knows the most recent network addresses of the mobile station, i.e. the MSC/VLR and SGSN addresses. Hence, the home location register HLR returns both addresses in the routing information, even though the mobile station is not reachable through the GPRS. If the GPRS is the primary network, an attempt is always made to first send the message through the GPRS network, thus creating unnecessary signalling when the mobile station cannot be reached through the GPRS network.

If there is an ongoing voice call at 'Class B mobile stations' which cannot simultaneously use packed-switched services and circuit-switched GSM services, the mobile station cannot be reached through the GPRS network. The short message can be directly delivered through the MSC/VLR as no separate paging is necessary in the GSM network when there is an established voice connection. However, when an attempt is made to deliver the short message through the serving support node SGSN, the serving support node sets a flag MSNRF as an indication of failure, even though the failure was due to the fact that the connection was suspended on account of an ongoing call. When the call is terminated, information on the fact that the mobile station MS is present in the GPRS network is unnecessarily sent to the home location register HLR.

BRIEF DESCRIPTION OF THE INVENTION

The object of the invention is as simple an operation as possible when short messages are sent to mobile stations that can operate in two networks.

The objects of the invention are achieved with a method and a radio network which are characterized in that which is disclosed in the independent claims. The preferred embodiments of the invention are set forth in the dependent claims.

In the invention parameters controlling the network elements are inserted into signalling messages and/or information on reachability of the mobile station is provided in a subscriber database, such as a home location register.

In a preferred embodiment of the invention a subscriber database storing the subscriber data of a mobile subscriber is provided with information on whether the mobile station is reachable through the primary network or not. If the mobile station is reachable through the primary network, the subscriber database responds to a routing information request by sending an address in the primary network and optionally an address in the second network to an interrogating network element. If the mobile station is not reachable through the primary network, the subscriber database responds to a routing information request by sending an address in the secondary network to the interrogating network element. "Primary network" refers to that part of a network through which attempts to reach the mobile station are made first, in other words the primary route. "Secondary network" refers to that part of a network through which attempts to reach the mobile station are made if the attempts to reach the mobile station through the primary network failed, in other words the secondary route.

Therefore, the advantage of the method and radio network of the invention is the fact that superfluous signalling is reduced when short messages are sent to mobile stations that are not reached at the precise moment of sending through the primary network.

BRIEF DESCRIPTION OF THE FIGURES

The invention will be described in further detail in the following by means of preferred embodiments with reference to the accompanying drawings, in which FIG. 3 represents a signalling chart in a situation where an attempt is made to deliver a short message to a mobile station that is attached to the GPRS network and to the GSM network but is then detached from the GPRS network, FIG. 4 represents a signalling chart of combined attach to the networks, FIG. 6 represents a signalling chart in a situation where a short message is delivered to a mobile station whose GPRS connection is suspended.

DETAILED DESCRIPTION OF THE INVENTION

The present invention is suitable for use in various combinations of two different data transmission systems in which the subscriber can obtain the same service via both systems. The invention is particularly suitable for use in implementing the General Packet Radio Service (GPRS) in the pan-European digital mobile communications system GSM (Global System for Mobile Communications) or corresponding mobile communications systems, such as DCS 1800 and PCS (Personal Communication System). In the following, the primary embodiments of the invention will be described by means of a GPRS packet radio network formed by a combination of the GPRS service and the GSM system, yet without limiting the invention to that kind of particular packet radio system.

Figure 1:
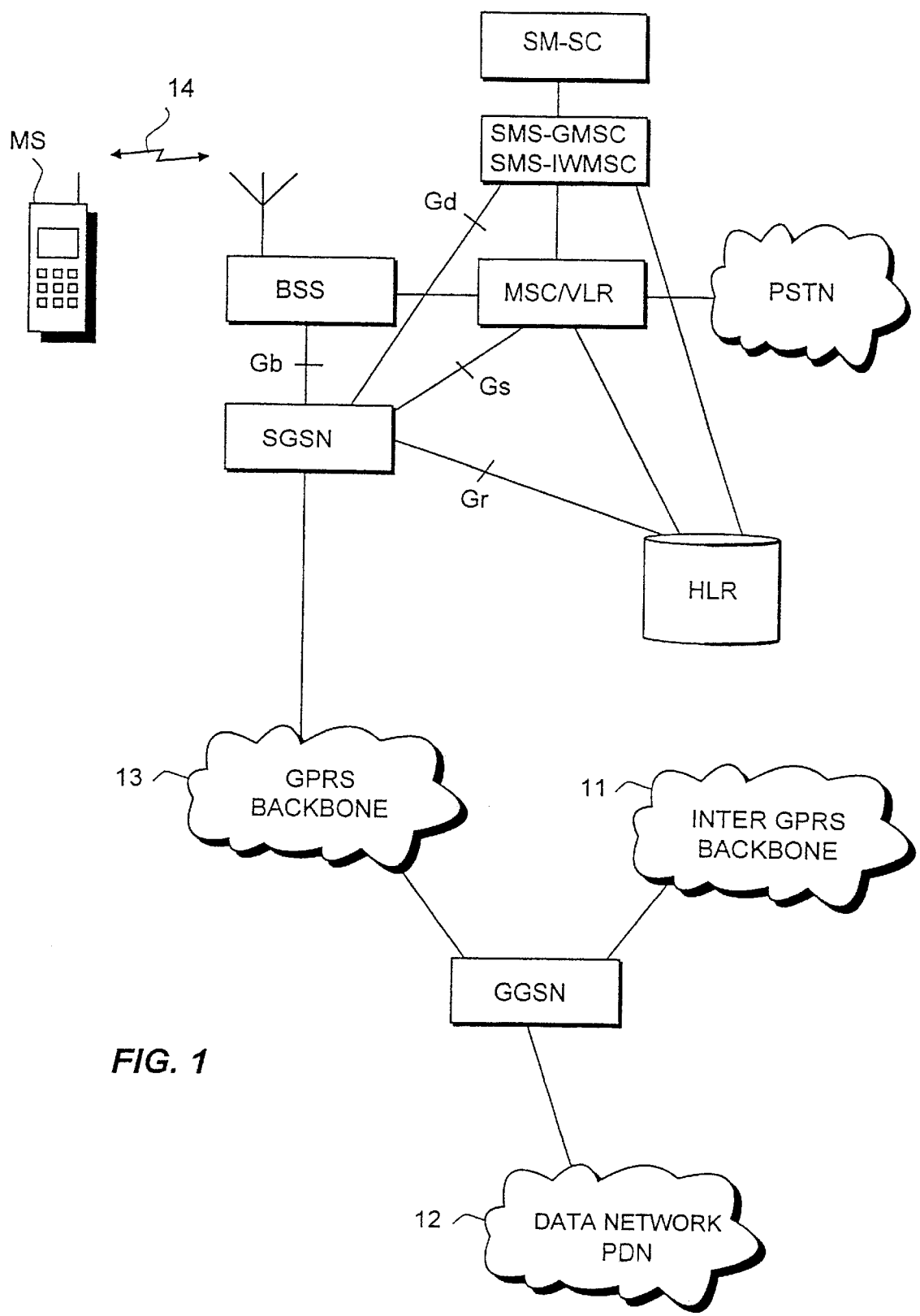
FIG. 1 illustrates the GPRS network architecture.

FIG. 1 illustrates a GPRS packet radio network implemented in the GSM system.

The basic structure of a GSM network is composed of two parts: a base station subsystem BSS and a network subsystem NSS. The base station subsystem BSS and the mobile stations MS communicate over radio links 14. For short message service, the GSM network has a connection to a short message service center SM-SC. The SM-SC has a connection to a gateway mobile switching center for short message service, SMS-GMSC, for delivery of short messages sent to the mobile station. For a more detailed exposition of the GSM system, reference is made to the ETSI/GSM recommendations and to *The GSM System for Mobile Communications*, M. Mouly and M. Pautet, Palaiseau, France, 1992, ISBN: 2-9507190-07-7.

In the figure, the GPRS system connected to the GSM network comprises one GPRS network having one serving GPRS support node SGSN and one GPRS gateway support node GGSN. These different support nodes SGSN and GGSN are interconnected by an Intra-Operator Backbone Network.

It is to be understood that the GPRS network may have any number of support nodes and gateway support nodes.

The serving GPRS support node SGSN is a node serving a mobile station MS. Each support node SGSN manages the packet data service in the area of one or more cells in a cellular packet radio network. For this purpose, each support node SGSN is connected (Gb interface) to a specific local part of the GSM mobile communications system. This connection is typically made to the base station subsystem BSS. A mobile station MS in a cell communicates across the radio interface 14 with a base station BTS and further through the mobile communications network with the support node SGSN to whose service area the cell belongs. In principle, the mobile communications network between the support node SGSN and the mobile station MS only relays packets between these two. For this purpose, the mobile communications network offers relay of packet-switched data packets between the mobile station MS and the serving support node SGSN. It is to be noted that the mobile communications network only provides a physical connection between the mobile station MS and the support node SGSN, and its precise operation and structure have no essential significance to the invention.

When the mobile station MS becomes attached to the GPRS network, i.e. in connection with a GPRS Attach procedure, the SGSN establishes a mobility management context (MM context) that contains information pertaining to the mobility and security of the mobile station MS. For clarity, reference is made to attach a mobile station to the network, unreachability of a mobile station etc., in the present application. By a mobile station in this context is generally meant a mobile unit or a mobile subscriber. In other words, one could also speak of attach of a mobile subscriber to the network, unreachability of a mobile subscriber, etc.

An association (Gs interface) may be provided between the SGSN and the MSC/VLR. In an association, the visitor location register MSC/VLR has stored the SGSN address and the class of the mobile station MS, and the SGSN has stored the address of the visitor location register VLR in the mobile-related data. Association is only possible for Class A and Class B mobile stations, which may be simultaneously attached to both networks. Association enables for example IMSI attach and IMSI detach via the serving support node SGSN and combined IMSI/GPRS attach and detach. IMSI attach means attach to the GSM network. Association also has the result that in circuit-switched services, i.e. GSM services, a mobile station MS is paged via the serving support node SGSN, in other words, the mobile services switching center MSC/VLR performs the paging by sending a paging message to the serving support node SGSN, which converts the paging message to an SGSN paging message.

An association is established when a mobile station is attached to either one of the networks and becomes attached to the other network, or in combined attach or combined location updating. The association is released in connection with detach from either network.

The GPRS gateway support node GGSN connects the GPRS network of the operator to the GPRS systems of other operators and to data networks 11–12, such as an Inter-Operator Backbone Network, IP network (Internet) or X.25 network. The GGSN comprises routing information on GPRS subscribers, i.e., SGSN addresses. SGSN and GGSN functionalities may be combined in the same physical node.

The home location register HLR of the GSM network comprises GPRS subscriber data and routing information, incorporating the International Mobile Subscriber Identity (IMSI) into this information. HLR maintains in its registers an address list for each subscriber, which contains the addresses of the short message service centers SM-SC storing short messages awaiting delivery to a mobile station MS. The home location register HLR in accordance with the invention may also be adapted to maintain in its registers information on the reachability of the mobile station in the primary network, which is in the first preferred embodiment the GPRS network. The serving GPRS support node SGSN has a Gr interface to the home location register HLR (direct signalling connection or through an intra-operator backbone network 13). The home location register HLR of a roaming mobile station MS may be in a ifferent mobile communications network than the serving SGSN.

The intra-operator backbone network 13, interconnecting the predator equipment SGSN and GGSN, may be implemented with a local area network, e.g. an IP network. It is to be noted that it is also possible to implement the operator GPRS network without any intra-operator backbone network, e.g. by implementing all features in a single computer.

The inter-operator backbone network is a network through which the gateway support nodes GGSN of different operators can communicate with one another.

Figure 2:
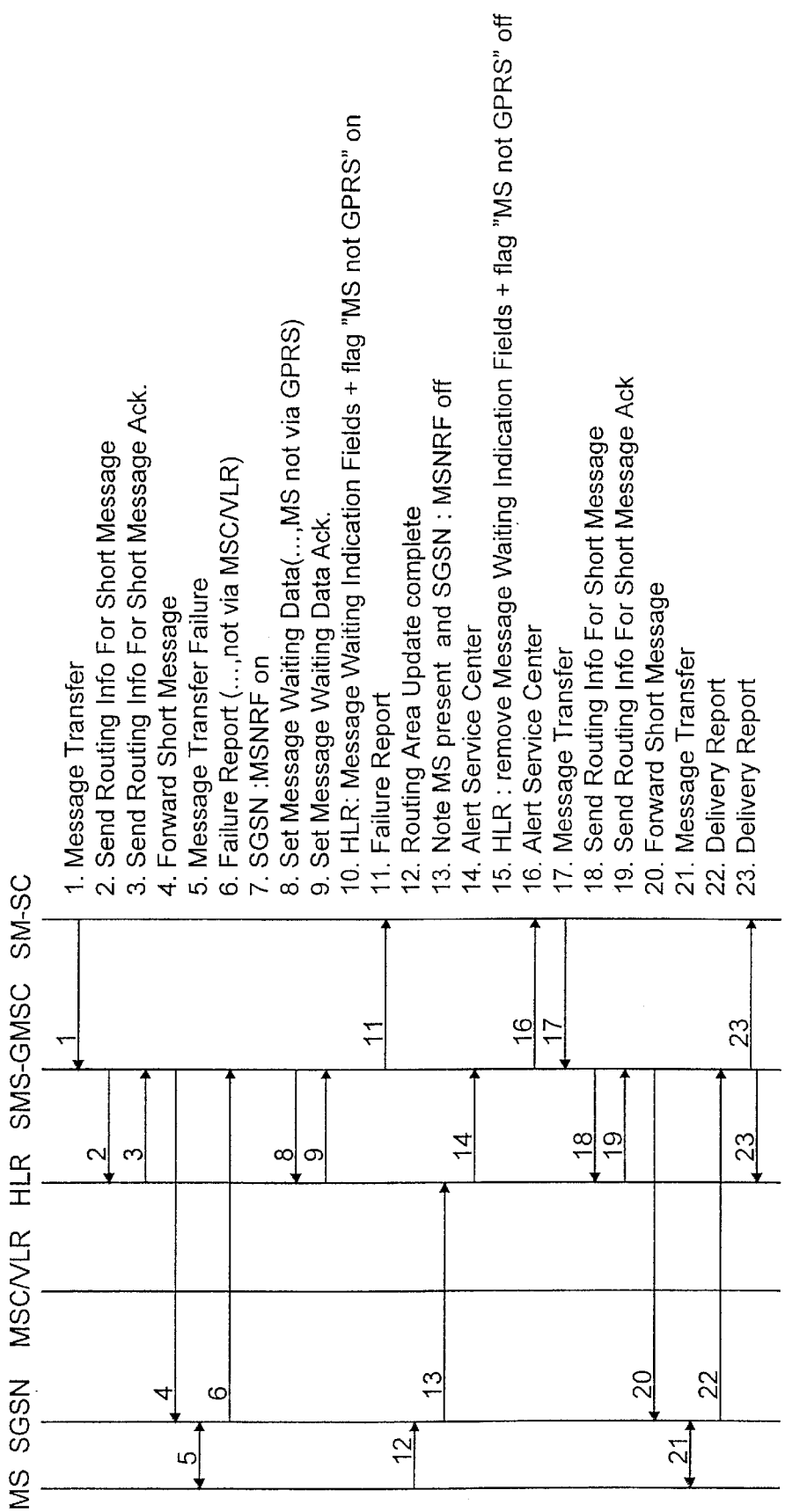
FIG. 2 represents a signalling chart in a situation where an attempt is made to deliver a short message to a mobile station MS that is attached to the GPRS network and to the GSM network.

FIG. 2 illustrates signalling in accordance with the invention in a situation where a mobile station MS is attached to the GPRS network as well as to the GSM network, and an association is established. The short message service center SM-SC has received a short message SM for delivery to the mobile station MS, but the mobile station cannot be reached by the GPRS network on account of roaming to a shadow region, for example, and thus the mobile station MS cannot be reached through the GPRS network. To reduce unnecessary signalling, the gateway mobile switching center for short message service, SMS-GMSC, should avoid sending of a short message through the GSM network, since the paging will take place through the GPRS network anyway. In the following description, the numbers refer to messages or steps in FIG. 2.

1. The short message service center SM-SC forwards the short message SM (Message Transfer) to the gateway mobile switching center for short message service, SMS-GMSC.

2. The gateway mobile switching center for short message service, SMS-GMSC, examines the address of the mobile station MS and requests routing information for the short message (Send Routing Info for Short Message) from the home location register HLR of the mobile station.

3. The home location register HLR returns an acknowledgement of the request (Send Routing Info for Short Message Ack) to the gateway mobile switching center for short message service, SMS-GMSC. The acknowledgement contains the current SGSN address and the MSC/VLR address of the mobile station MS. Since the acknowledgement contains both addresses, an attempt is made to deliver the short message through the serving support node SGSN, and if this is not successful, only thereafter through the mobile services switching center MSC/VLR. The acknowledgement could contain either address only, if the home location register HLR included only one address, but in that case the final signalling would be different.

4. The gateway mobile switching center for short message service, SMS-GMSC, forwards the short message SM (Forward Short Message) to the serving support node SGSN.

5. The serving support node SGSN attempts to transfer the short message SM to the mobile station MS but fails (Message Transfer Failure). Failure may be due to the fact that the mobile station MS is located in a shadow region or the radio channel conditions are otherwise too poor for successful transmission.

6. The serving support node SGSN returns a message on a failed delivery attempt (Failure Report) to the gateway mobile switching center for short message service, SMS-GMSC. In accordance with a first embodiment of the invention, this message includes a parameter (not via MSC/VLR) signalling to the gateway mobile switching center for short message service, SMS-GMSC: do not attempt to send short message SM through mobile services switching center MSC/VLR. The SMS-GMSC analyzes the Failure Report message, and upon detecting the parameter (not via MSC/VLR) does not transmit the short message through the MSC/VLR. If the Failure Report message does not include the parameter (not via MSC/VLR), the SMS-GMSC performs "GSM paging", as was explained above in connection with the description of the prior art. This also happens in embodiments of the invention in which the parameter (not via MSC/VLR) is not used at all.

7. The serving support node SGSN sets a flag MSNRF indicating that despite attempts the mobile station has not been reached.

8. The gateway mobile. switching center for short message service, SMS-GMSC, sends a Set Message Waiting Data message to the home location register HLR of the mobile station MS. In accordance with the first embodiment of the invention, this message also includes a parameter (MS not GPRS) indicating that the mobile station MS cannot be reached through the GPRS network. The last-mentioned parameter is explained in greater detail in connection with FIG. 5.

9. The home location register HLR acknowledges receipt of the message (Set Message Waiting Data Ack) to the gateway mobile switching center for short message service, SMS-GMSC.

10. The home location register HLR updates its registers (Message Waiting Indication Fields) by inserting thereinto an indication of a message waiting at the short message service center SM-SC for delivery to the mobile station MS. Furthermore, in the primary embodiment of the invention the HLR sets a flag (MS not GPRS) indicating that the mobile station MS cannot be reached through the GPRS network if the message sent in step 8 included said parameter (MS not GPRS). The flag is retained as long as the short message waiting data is retained.

11. The gateway mobile switching center for short message service, SMS-GMSC, returns a message on a failed delivery attempt (Failure Report) to the short message service center SM-SC, which stores the short message SM for later delivery.

12. The mobile station MS again becomes reachable in the GPRS network for example through updating its routing area, and the serving support node SGSN receives a message on the presence of the MS (Routing Area Update Complete). The mobile station may also indicate by other means that it is again reachable and utilize other messages than the above. What is essential is that the serving support cell detects that the mobile station can be reached.

13. The serving GPRS support node SGSN detects that the flag MSNRF is set, clears the flag and sends information on the fact that the mobile station is again reachable (Note MS present) to the home location register HLR.

14. The home location register HLR detects that there is a short message SM awaiting delivery to the mobile station SM and sends an alert message (Alert Service Center) to the gateway mobile switching center for short message service, SMS-GMSC.

15. The home location register HLR updates its Message Waiting Indication Fields by deleting therefrom the indication of a message waiting for delivery to the mobile station MS. At the same time, the HLR clears the flag (MS not GPRS) in accordance with the invention which indicates that the mobile station MS cannot be reached through the GPRS network.

16. The gateway mobile switching center for short message service, SMS-GMSC, sends an alert message (Alert Service Center) to the short message service center SM-SC.

17. The short message service center SM-SC forwards the short message SM (Message Transfer) to the gateway mobile switching center for short message service, SMS-GMSC (same as step 1).

18. The gateway mobile switching center for short message service, SMS-GMSC, examines the address of the mobile station MS and requests routing information for the short message (Send Routing Info for Short Message) from the home location register HLR of the mobile station (same as step 2).

19. The home location register HLR returns an acknowledgement of the request (Send Routing Info for Short Message Ack) to the gateway mobile switching center for short message service, SMS-GMSC. The acknowledgement contains the current SGSN address and the MSC/VLR address of the mobile station MS. Since the acknowledgement contains both addresses, an attempt is made to deliver the short message through the serving support node SGSN (same as step 3).

20. The gateway mobile switching center for short message service, SMS-GMSC, forwards the short message SM (Forward Short Message) to the serving support node SGSN (same as step 4).

21. The serving support node SGSN transfers the short message SM to the mobile station MS (Message Transfer).

22. The serving support node SGSN returns a message on successful delivery (Delivery Report) to the gateway mobile switching center for short message service, SMS-GMSC.

23. The gateway mobile switching center for short message service, SMS-GMSC, returns messages on successful delivery (Delivery Report) to the home location register HLR and to the short message service center SM-SC.

By inserting a parameter 'do not attempt to send short message SM through mobile services switching centre MSC/VLR' into the message sent to the gateway mobile switching center for short message service, SMS-GMSC, in step 6, the previously described unnecessary signalling between the mobile services switching center MSC/VLR and the gateway mobile switching center for short message service, SMS-GMSC, and the signalling caused by the paging of the mobile station is avoided. The GSM paging would have been carried out through the same serving support node SGSN through which paging just failed. Furthermore, setting of the flag MSNRF in the visitor location register VLR and the resultant unnecessary signalling between the mobile services switching center MSC and the home location register HLR, also among the drawbacks of the prior art approaches, are avoided.

When in step 8 a parameter indicating that the mobile station is not reachable through the GPRS network (Set Message Waiting Data) is inserted into the message and the home location register HLR updates this information in its registers in step 10, unnecessary paging operations in the GPRS network can be avoided until the home location register has received the information that the mobile station is again reachable through the GPRS (i.e., until step 15 in the example of FIG. 2). When the HLR receives the. MS routing information inquiry, it checks whether the MS has a parameter (MS not GPRS). If the parameter (MS not GPRS) is present, the HLR responds to the routing information inquiry by sending the address of the mobile services switching center MSC/VLR only (i.e., the SGSN address is not given in the response). This has the advantage, for instance, of eliminating unnecessary attempts to deliver short messages through the GPRS network, as the messages cannot be delivered to destination. The same information can be utilized in other GPRS services as well. If the parameter (MS not GPRS) is not present (e.g. prior to step 10 and after step 15 in the example of FIG. 2), the HLR responds to the routing information inquiry by sending the address of the mobile services switching center MSC/VLR and the SGSN address. This also happens in embodiments of the invention in which the parameter (MS not GPRS) is not used at all.

In the above first embodiment of the invention, both parameters, "do not attempt to send short message SM through mobile services switching center MSC/VLR" and "mobile subscriber not reachable through GPRS network", have been used; this gives the best result from the point of view of signalling. It is to be noted, however, that it is possible to use only one of these parameters and thereby reduce the number of signalling messages as compared to the prior art. If one of the parameters is omitted, also the signalling will be different from that described above.

The steps have not been set out in absolute time sequence. Some of the above-described steps may take place simultaneously or in a different order. Such steps include steps 6 and 7, 9 and 10, 12 and 13, 14 and 15, and 22 and 23.

FIG. 3 represents signalling in a similar situation as in FIG. 2. The only difference lies in that the mobile station MS is detached from the GPRS network after unsuccessful delivery of a short message SM. To ensure as rapid delivery of short messages as possible, the visitor location register MSC/VLR must also be caused to alert the home location register HLR of the presence of the mobile station in the network. In the following description, the numbers refer to messages or steps in FIG. 3. Steps 1–11 are the same as in FIG. 2.

1. The short message service center SM-SC forwards the short message SM (Message Transfer) to the gateway mobile switching center for short message service, SMS-GMSC.

2. The gateway mobile switching center for short message service, SMS-GMSC, examines the address of the mobile station MS and requests routing information for the short message (Send Routing Info for Short Message) from the home location register HLR of the mobile station.

3. The home location register HLR returns an acknowledgement of the request (Send Routing Info for Short Message Ack) to the gateway mobile switching center for short message service, SMS-GMSC. The acknowledgement contains the current SGSN address and the MSC/VLR address of the mobile station MS. Since the acknowledgement contains both addresses, an attempt is made to deliver the short message through the serving support node SGSN, and if this is not successful, only thereafter through the mobile services switching center MSC/VLR. The acknowledgement could contain either address only, if the home location register HLR included only one address, but in that case the signalling would be different.

4. The gateway mobile switching center for short message service, SMS-GMSC, forwards the short message SM (Forward Short Message) to the serving support node SGSN.

5. The serving support node SGSN attempts to transfer the short message SM to the mobile station MS but fails (Message Transfer Failure). Failure may be due to the fact that the mobile station MS is located in a shadow region or the radio channel conditions are otherwise too poor for successful transmission.

6. The serving support node SGSN returns a message on a failed delivery attempt (Failure Report) to the gateway mobile switching center for short message service, SMS-GMSC. The message includes a parameter (not via MSC/VLR) signalling to the gateway mobile switching center for short message service, SMS-GMSC: do not attempt to send short message SM through mobile services switching center MSC/VLR.

7. The serving support node SGSN sets a flag MSNRF indicating that despite attempts the mobile station has not been reached.

8. The gateway mobile switching center for short message service, SMS-GMSC, sends a Set Message Waiting Data message to the home location register HLR of the mobile station MS. The message preferably also includes information on the fact that the mobile station MS cannot be reached through the GPRS network (MS not via GPRS).

9. The home location register HLR acknowledges receipt of the message (Set Message Waiting Data Ack) to the gateway mobile switching center for short message service, SMS-GMSC.

10. The home location register HLR updates its registers (Message Waiting Indication Fields) by inserting thereinto an indication of a message waiting at the short message service center SM-SC for delivery to the mobile station MS and sets a flag (MS not GPRS) indicating that the mobile station MS cannot be reached through the GPRS network if the message sent in step 8 included said information.

11. The gateway mobile switching center for short message service, SMS-GMSC, returns a message on a failed delivery attempt (Failure Report) to the short message service center SM-SC, which stores the short message SM for later delivery.

12. The mobile station is detached from the GPRS network. Detach from the GPRS may be due either to the fact that the serving support node SGSN makes a detach decision as the mobile station MS does not respond to a paging request, or to the fact that the stand-by time expires and both the mobile station MS and the serving support node GPRS update in the MM context an indication of the MS having changed to idle state. In the lastmentioned alternative, the mobile station MS can be reached through the GSM network.

13. The serving GPRS support node SGSN indicates to the mobile services switching center MSC/VLR that the association is released. In accordance with a second embodiment of the invention, the serving support node SGSN sends in the same message a parameter (put MSNRF on) commanding the visitor location register MSC/VLR to set a flag MSNRF.

14. Upon receipt of the parameter (put MSNRF on) from the serving support node SGSN, the visitor location register MSC/VLR sets a flag MSNRF as an indication of the fact that the mobile station cannot be reached in the GSM network.

By inserting in step 13 a parameter (put MSNRF on) in accordance with the second embodiment of the invention into the message sent from the serving support node SGSN to the mobile services switching center MSC/VLR, in consequence of which a flag MSNRF is set in the visitor location register MSC/VLR in step 14, it is ensured that the short message can be delivered at the earliest opportunity when the mobile station registers with either network. Without the flag being set in step 14, the short message SM would be delivered only after the mobile station is attached to the GPRS network.

By inserting a parameter 'do not attempt to send short message SM through mobile services switching center MSC/VLR' into the message sent to the gateway mobile switching center for short message service, SMS-GMSC, in step 6, signalling between the mobile services switching center MSC/VLR and the gateway mobile switching center for short message service, SMS-GMSC, and the signalling caused by paging of the mobile station is avoided. The paging would have been carried out through the serving support node SGSN.

If a parameter indicating that the mobile station cannot be reached through the GPRS network is inserted into the message in step 8, and the home location register HLR updates that information in its registers in step 10, the home location register sends only the address of the mobile services switching center MSC/VLR in response to a routing information request for the mobile station MS until a time when this information is available in the register (i.e., until step 15). This has the advantage, for instance, of eliminating unnecessary attempts to deliver short messages through the GPRS network, as the messages cannot be delivered to destination. The same information can be utilized in other GPRS services as well.

The delivery of the short message is dependent on how the mobile station MS will attach to the networks. If the mobile station indicates its presence in the GSM network (IMSI attach) first, the short message is sent through the GSM network in the normal way. If the parameter "mobile subscriber not reachable through GPRS network" is not used, the gateway mobile switching center for short message service, SMS-GMSC, receives the addresses of both networks and attempts first to send the short message through the GPRS network without success, and only thereafter through the GSM network. However, the delivery of the short message will be successful, as the mobile station MS listens to the GSM control channels and the GSM paging is carried out as normal paging since there is no association. However, the flag MSNRF remains set in the serving GPRS support node. When the mobile station MS is then attached to the GPRS network, the serving support node SGSN clears the flag and sends a message about the arrival of the MS in the network to the home location register HLR, which then deletes the parameter "mobile subscriber not reachable through GPRS network" from its register, if such a parameter is in use.

If the mobile station attaches to the GPRS network first or performs combined attach, the delivery of the short message SM to the mobile station MS takes place through the GPRS network using the signalling described in connection with FIG. 2 (steps 13–23).

All three parameters, "do not attempt to send short message SM through mobile services switching center MSC/VLR", "mobile subscriber not reachable through GPRS network", and "put MSNRF on", have been used in the second embodiment of the invention described above; this will give the best result from the point of view of signalling. It is to be noted, however, that also one or two of these parameters may be used and the number of signalling messages reduced as compared to the prior art. If one or more of the parameters is omitted, also the signalling will differ from that described above.

The steps have not been set out in absolute time sequence in FIG. 3. Some of the above-described steps may take place simultaneously or in a different order. Such steps include steps 6 and 7, and 9 and 10.

FIG. 4 represents signalling in accordance with a third embodiment of the invention, by means of which the flag MSNRF set in the visitor location register MSC/VLR can be cleared if the mobile station MS is attached to the GPRS network and becomes attached to the GSM network or performs combined attach. In that case, the short message has been/will be delivered to the mobile station MS through the GPRS network, and the flag MSNRF set in the visitor location register MSC/VLR is unnecessary and causes superfluous signalling. The signalling shown in FIG. 4 may well be combined with the signalling shown in FIG. 3, but it may also be implemented without insertion of the parameters "do not attempt to send short message SM through mobile services switching center MSC/VLR" and "mobile subscriber not reachable through GPRS network", or in such a way that only one of the parameters is inserted. Simultaneously with the signalling shown in FIG. 4, the delivery of the short message SM to the mobile station MS through the GPRS network can be carried out by using the signalling described in connection with FIG. 2 (steps 13–23). The signalling shown in FIG. 4 may be carried out for a dual-mode mobile station; a single-mode mobile station can only be attached to one network at a time. FIG. 4 shows the outcome of combined attach. An association has been established already prior to the signalling shown in the figure. Since attach to the GSM network (IMSI-attach) of a mobile station MS already attached to the GPRS network is performed through the serving support node SGSN, simultaneously establishing an association, its signalling is also similar, only the names of the messages may be different. In the following description, the numbers refer to messages or steps in FIG. 4.

1. The mobile station MS acknowledges the attach (Attach Complete) to the serving support node SGSN.

2. The serving support cell SGSN sends an acknowledgement of the attach of the mobile station MS to the GSM network (TMSI Reallocation Complete) to the visitor location register MSC/VLR. The acknowledgement includes a parameter in accordance with a third embodiment of the invention (put MSNRF off), commanding the visitor location register MSC/VLR to clear the flag MSNRF.

3. The visitor location register MSC/VLR clears the flag MSNRF.

By inserting the parameter "put MSNRF off" into the message sent to the visitor location register in step 2, unnecessary signalling between the mobile services switching center MSC and the home location register HLR caused by the flag MSNRF is avoided. The same result is achieved if the visitor location register MSC/VLR is adapted not to inform the home location register HLR that the mobile station MS is reachable in the network upon receipt of a GSM attach acknowledgement from the serving support node SGSN. The same principle can also be applied if a mobile station attached to the GSM network becomes attached to the GPRS network when the home location register does not maintain information on the fact that the mobile station cannot be reached through the GPRS network.

Figure 5:
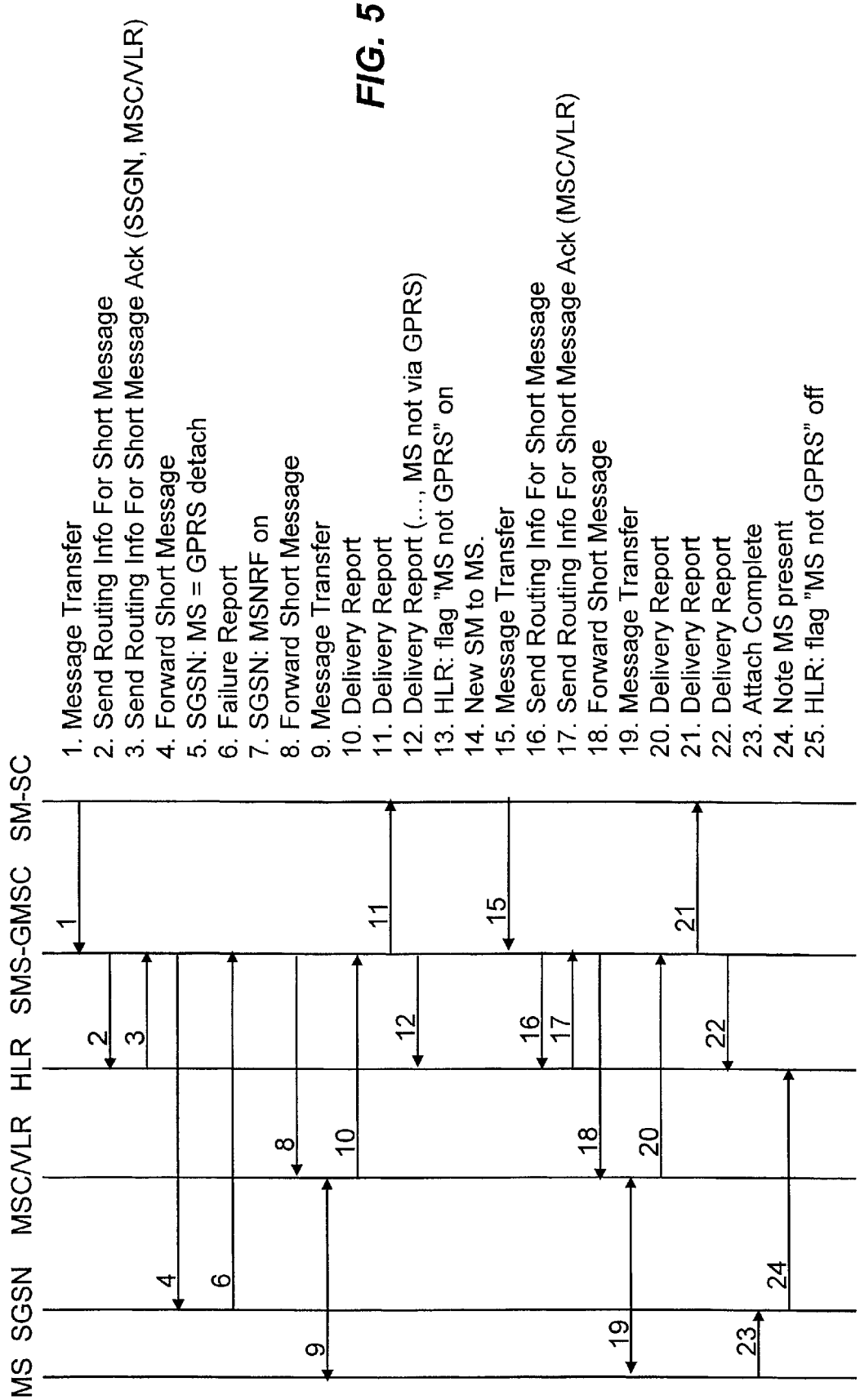
FIG. 5 represents a signalling chart in a situation where short messages are delivered to a mobile station that is detached from the GPRS network but is attached to the GSM network.

FIG. 5 shows the signalling needed to deliver a short message SM when the mobile station is detached from the GPRS network but is attached to the GSM network. To reduce unnecessary signalling, the gateway mobile switching center for short message service, SMS-GMSC, should avoid sending of a short message through the GSM network, since the paging will take place through the GPRS network anyway. In the following description, the numbers refer to messages or steps in FIG. 5.

1. The short message service center SM-SC forwards the short message SM (Message Transfer) to the gateway mobile switching center for short message service, SMS-GMSC.

2. The gateway mobile switching center for short message service, SMS-GMSC, examines the address of the mobile station MS and requests routing information for the short message (Send Routing Info for Short Message) from the home location register HLR of the mobile station.

3. The home location register HLR returns an acknowledgement of the request (Send Routing Info for Short Message Ack) to the gateway mobile switching center for short message service, SMS-GMSC. The acknowledgement contains the current SGSN address and the MSC/VLR address of the mobile station MS. Since the acknowledgement contains both addresses, an attempt is made to deliver the short message through the serving support node SGSN, and if this is not successful, only thereafter through the mobile services switching center MSC/VLR. The acknowledgement could contain only one of the addresses, in which case an attempt would be made to deliver the short message through one network only.

4. The gateway mobile switching center for short message service, SMS-GMSC, forwards the short message SM (Forward Short Message) to the serving support node SGSN.

5. The serving support node SGSN detects that the mobile station MS is detached from the GPRS network (MS=GPRS detach).

6. The serving support node SGSN returns a message on a failed delivery attempt (Failure Report) to the gateway mobile switching center for short message service, SMS-GMSC.

7. The serving support node SGSN sets a flag MSNRF indicating that despite attempts the mobile station has not been reached.

8. The gateway mobile switching center for short message service, SMS-GMSC, forwards the short message SM (Forward Short Message) to the mobile services switching center MSC/VLR.

9. The mobile services switching center MSC/VLR transfers the short message to the mobile station MS (Message Transfer) normally through the GSM network. Since the mobile station MS was detached from the GPRS network, it was listening to the GSM paging channel and the delivery of the short message SM was successful.

10. The mobile services switching center MSC/VLR returns a message on successful delivery (Delivery Report) to the gateway mobile switching center for short message service, SMS-GMSC.

11. The gateway mobile switching center for short message service, SMS-GMSC, returns a message on successful delivery (Delivery Report) to the short message service center SM-SC.

12. The gateway mobile switching center for short message service, SMS-GMSC, returns a message on successful delivery (Delivery Report) to the home location register HLR of the mobile station MS. In accordance with a fourth embodiment of the invention, the gateway mobile switching center for short message service, SMS-GMSC, inserts a parameter indicating that the mobile station MS cannot be reached through the GPRS network (MS not via GPRS) into the message. The gateway mobile switching center for short message service either inserts the parameter implicitly, since it received a failure report from the serving support node SGSN, or the failure report sent in step 6 may also include a parameter causing insertion of a parameter "mobile subscriber MS not reachable through GPRS network" into the message sent to the home location register.

13. The home location register HLR sets a flag indicating that the mobile station MS cannot be reached through the GPRS network (MS not GPRS).

14. The short message service center receives a new short message for delivery to the mobile station MS.

15. The short message service center SM-SC forwards the short message SM (Message Transfer) to the gateway mobile switching center for short message service, SMS-GMSC (same as step 1).

16. The gateway mobile switching center for short message service, SMS-GMSC, examines the address of the mobile station MS and requests routing information for the short message (Send Routing Info for Short Message) from the home location register HLR of the mobile station (same as step 2).

17. The home location register HLR returns an acknowledgement of the request (Send Routing Info for Short Message Ack) to the gateway mobile switching center for short message service, SMS-GMSC. The acknowledgement contains only the current MSC/VLR address of the mobile station MS, since the home location register HLR has a flag "mobile subscriber MS not reachable through GPRS network" set.

18. The gateway mobile switching center for short message service, SMS-GMSC, forwards the short message SM (Forward Short Message) to the mobile services switching center MSC/VLR (same as step 8).

19. The mobile services switching center MSC/VLR transfers the short message to the mobile station MS (Message Transfer) normally through the GSM network. Since the mobile station MS was detached from the GPRS network, it was listening to the GSM paging channel and the delivery of the short message SM was successful (same as step 9).

20. The mobile services switching center MSC/VLR returns a message on a successful delivery (Delivery Report) to the gateway mobile switching center for short message service, SMS-GMSC (same as step 10).

21. The gateway mobile switching center for short message service, SMS-GMSC, returns a message on successful delivery (Delivery Report) to the short message service center SM-SC (same as step 11).

22. The gateway mobile switching center for short message service, SMS-GMSC, returns a message on successful delivery (Delivery Report) to the home location register HLR of the mobile station MS. In this case, the a gateway mobile switching center for short message service, SMS-GMSC, does not insert the parameter "mobile subscriber MS not reachable through the GPRS network" into the message.

23. The mobile station again becomes attached to the GPRS network (Attach Complete), to the nearest serving support node SGSN.

24. The serving GPRS support node SGSN detects that a flag MSNRF is set, clears the flag and sends information on the fact that the mobile station MS is again reachable (Note MS present) to the home location register HLR.

25. The home location register HLR clears the flag indicating that the MS is not reachable through the GPRS network. Thereafter it gives both the SGSN address and the MSC/VLR address for the mobile station in response to a routing information request.

By inserting the parameter "mobile subscriber MS not reachable through the GPRS network" into the message sent to the home location register HLR in step 12 and by maintaining a flag in the registers of the home location register HLR, unnecessary signalling between the gateway mobile switching center for short message service, SMS-GMSC, and the serving support node SGSN is avoided during the time the mobile station is detached from the GPRS network. The above parameter can also be utilized in other data transmission than short messages. Moreover, the signalling message sent in step 24 is significant as it produces a change in the home location register HLR.

It is not worth-while to send the parameter "mobile subscriber MS not reachable through the GPRS network" to the home location register HLR when the mobile station becomes detached from the network, as signalling for detach only takes place between the mobile station MS and the serving support node SGSN. There is no purpose for extra signalling toward the home location register, since it is by no means certain that attempts are made to deliver short messages to the mobile station during the time it is detached from the network. Normal signalling is utilized in the invention, thereby reducing unnecessary signalling.

If the GSM network had not succeeded in delivering the short message, the above-described signalling would have been slightly different. In that case, in step 12 the Set Message Waiting Data message (same as in step 8, FIG. 2) would have been sent to the home location register and the parameter "mobile subscriber MS not reachable through GPRS network" would have been inserted into the message, exactly as was done in step 12 in the above description. Insertion of the parameter has the same effect on the operation of the home location register HLR regardless of into which message the parameter is inserted.

The steps set out in FIG. 5 are not in absolute time sequence. Some of the above-described steps may take place simultaneously or in a different order. Such steps include steps 4 and 5, 7 and 8, 11 and 12, and 21 and 22.

FIG. 6 represents signalling in the case of a dual-mode telephone that is not capable of simultaneously being in circuit-switched connection (e.g. in a voice call) and receiving data packets, i.e. a 'Class B telephone'. The GPRS connection of such a telephone is suspended for the time the mobile services switching center MSC/VLR is in connected state. Short messages are very easy to send to a mobile station MS in circuit-switched connection, as an existent GSM channel can be used for their delivery. In the following description, the numbers refer to messages or steps in FIG. 6.

1. The short message service center SM-SC forwards the short message SM (Message Transfer) to the gateway mobile switching center for short message service, SMS-GMSC.

2. The gateway mobile switching center for short message service, SMS-GMSC, examines the address of the mobile station MS and requests routing information for the short message (Send Routing Info for Short Message) from the home location register HLR of the mobile station.

3. The home location register HLR returns an acknowledgement of the request (Send Routing Info for Short Message Ack) to the gateway mobile switching center for short message service, SMS-GMSC. The acknowledgement contains the current SGSN address and the MSC/VLR address of the mobile station MS. Since the acknowledgement contains both addresses, an attempt is made to deliver the short message through the serving support node SGSN, and if this is not successful, only thereafter through the mobile services switching center MSC/VLR.

4. The gateway mobile switching center for short message service, SMS-GMSC, forwards the short message SM (Forward Short Message) to the serving support node SGSN.

5. The serving support node SGSN detects that the mobile station MS is suspended from the GPRS network.

6. The serving support node SGSN returns a message on a failed delivery attempt (Failure Report) to the gateway mobile switching center for short message service, SMS-GMSC. In accordance with a fifth embodiment of the invention, a parameter (GPRS reachable) is inserted into the message, indicating that the mobile station is reachable through the GPRS network immediately after the circuit-switched connection has been released. In this case, the serving support node SGSN does not set a flag MSNRF, since the mobile station is suspended.

7. The gateway mobile switching center for short message service, SMS-GMSC, forwards the short message SM (Forward Short Message) to the mobile services switching center MSC/VLR.

8. The mobile services switching center MSC/VLR transfers the short message (Message Transfer) to the mobile station MS normally through the GSM network.

9. The mobile services switching center MSC/VLR returns a message on successful delivery (Delivery Report) to the gateway mobile switching center for short message service, SMS-GMSC.

10. The gateway mobile switching center for short message service, SMS-GMSC, returns a message on successful delivery (Delivery Report) to the short message service center SM-SC.

11. The gateway mobile switching center for short message service, SMS-GMSC, returns a message on successful delivery (Delivery Report) to the home location register HLR of the mobile station MS. In this case, the gateway mobile switching center for short message service, SMS-GMSC, does not insert the parameter which indicates that the mobile station MS cannot be reached through the GPRS network and which was described in detail in connection with FIG. 5 into the message, even though said parameter were in use, since the message received by the gateway mobile switching center for short message service included the parameter "mobile subscriber MS reachable through the GPRS network".

When the circuit-switched connection is released, the mobile services switching center MSC/VLR sends a message (Resume) to the serving support node SGSN, and on the basis of this message the serving support node can resume the packet-switched data transfer. Since the Resume message does not direct the SGSN to inform the home location register HLR of the fact that the mobile station MS is again reachable, insertion of the parameter in step 7 as described above ensures that the short messages are delivered primarily through the GPRS network. Otherwise an attempt would be made to deliver them through the GSM network which at any rate would perform the paging of the mobile station as GPRS paging using the serving support node SGSN. This would cause unnecessary signalling between the mobile services switching center MSC/VLR and the serving support node SGSN. The unnecessary signalling can be avoided by sending the short message directly to the serving support node SGSN.

Furthermore, if for some reason it were not possible to deliver the short message in step 9 to the mobile station MS, the gateway mobile switching center for short message service, SMS-GMSC, detects upon receipt of a failure report message from the mobile services switching center MSC/VLR that the mobile station MS is reachable through the GPRS network and sends the short message for retransmission through the serving support node SGSN. Since in step 9 the short message could not be delivered, the circuit-switched connection was released and the serving support node SGSN can again attempt to transmit to the mobile station MS through the GPRS network.

The steps shown in FIG. 6 have not been set out in absolute time sequence, but some of the above-described steps may take place simultaneously or in a different order. Such steps include steps 10 and 11.

Each of the parameter insertions described in connection with the figures above can be carried out independently of other parameter insertions, and insertions may be freely combined to avoid unnecessary signalling. The names of the signalling messages may differ from those set out above, but the information transmitted in the messages is the same. The messages may also include more information than what is stated above.

For the sake of clarity the invention is described above assuming that the primary network is a GPRS network. The primary network can also be a GSM network. An operator can also choose which route or network is the primary network and which is the secondary network.

The accompanying drawings and the description pertaining to them are only intended to illustrate the present invention. Different variations and modifications to the invention will be apparent to those skilled in the art, without departing from the scope and spirit of the invention defined in the appended claims.

What is claimed is:

1. A method for delivering short messages to a mobile station operating in two different networks capable of delivering short messages, one of the networks being a primary network and the other one being a secondary network so that attempts to reach a mobile station are primarily made through the primary network first, and the mobile station may be attached to the primary and secondary network simultaneously, wherein if a short message cannot be delivered to the mobile station through the primary network, the method comprising:

sending information to a home location register on the fact that the mobile station is not reachable through the primary network, and the next time the home location register is interrogated about routing information for the mobile station, sending an address in the secondary network.

2. The method as claimed in claim 1, wherein when the mobile station is again reachable through the primary network, the information according to which the mobile station cannot be reached through the primary network is cleared from the home location register in response to a message sent by the primary network, the next time the home location register is interrogated about the routing information for the mobile station, the addresses of the primary and secondary networks are sent.

3. The method as claimed in claim 1, wherein if the mobile station is attached to the primary network and the short message delivery through the primary network fails, delivery of the short message through the secondary network is prevented.

4. The method as claimed in claim 3, wherein if the mobile station becomes detached from the primary network, information is sent to the node of the secondary network on the fact that an attempt has been made to reach the mobile station but the attempt has not been successful.

5. The method as claimed in claim 4, wherein if the mobile station becomes attached to the secondary network through the primary network, the node of the secondary network is prevented from informing the home location register of the mobile station of the mobile station becoming attached to the secondary network by deleting from the node of the secondary network said information on the fact that an attempt has been made to reach the mobile station but the attempt has not been successful.

6. The method as claimed in claim 1, wherein one of the networks is a GPRS network and the other one is a GSM network.

7. A method for delivering short messages to a mobile station operating in two different networks capable of delivering short messages, one of the networks being a primary network and the other one being a secondary network so that attempts to reach the mobile station are primarily made through the primary network first, the connection of said mobile station in the primary network being suspended for the time the mobile station is in communication through the secondary network, wherein if a short message is delivered during the time the primary network connection is suspended, a flag indicating the attempt to reach the mobile station is kept deactivated, and an indication of the fact that the mobile station can be reached through the primary network is sent in a failure report message.

8. A method for delivering short messages to a mobile station operating in two different networks capable of delivering short messages, one of the networks being a primary network and the other one being a secondary network so that attempts to reach the mobile station are primarily made through the primary network first, wherein if the mobile station becomes attached to the secondary network through the primary network, the node of the secondary network is prevented from informing the home location register of the mobile station becoming attached to the secondary network by ensuring that the information possibly held in the node of the secondary network on the fact that an attempt has been made to reach the mobile station but the attempt has not been successful is deleted.

9. A method for delivering short messages to a mobile station operating in two different networks capable of delivering short messages, one of the networks being a primary network and the other one being a secondary network so that attempts to reach the mobile station are primarily made through the primary network first, said mobile station being attached to the primary network, wherein delivery of the short message through the secondary network is prevented if the short message cannot be delivered to the mobile station through the primary network and it is obvious that delivery of the short message through the secondary network will not be successful either.

10. A method for delivering short messages to a mobile station operating in two different networks capable of delivering short messages, one of the networks being a primary network and the other one being a secondary network so that attempts to reach the mobile station are primarily made through the primary network first, and the mobile station may be attached to the primary and secondary network simultaneously, the method comprising:

providing a subscriber database with information on whether a mobile station is reachable through a primary network, receiving a routing information request at a subscriber database, sending an address in the primary network and optionally an address in a secondary network as a routing information response, if the mobile station is reachable through the primary network, and sending an address in the secondary network as a routing information response, if the mobile station is not reachable through the primary network.

11. A cellular packet radio system, comprising:

at least one mobile station, at least one packet radio support node connected to a digital cellular radio network offering to said at least one packet radio support node a radio interface for packet-switched data transfer with said at least one mobile station, at least one gateway mobile switching center for short message service connected to the at least one packet radio support node and to the digital cellular radio network for delivery of short messages to the at least one mobile station, at least one home location register for maintaining routing addresses for the at least one mobile station, the at least one gateway mobile switching center for short message service to deliver a mobile-terminated short message primarily through a serving packet radio support node of a packet radio network using an address of the packet radio network and to attempt retransmission of the short message through the digital cellular radio network in response to a failure report message received from the serving packet radio support node if the home location register gives both network addresses, the digital cellular radio network pages the mobile station through the serving packet radio support node of the packet radio network each time the mobile station is simultaneously attached to both networks, wherein if the serving packet radio support node does not succeed in delivering the short message to the mobile station, the packet radio support node inserts into said failure report message sent to gateway mobile switching center for short message service information preventing the gateway mobile switching center from retransmitting the short message through the digital cellular radio network.

12. The cellular packet radio system as claimed in claim 11, wherein when the mobile station becomes detached from the packet radio network, the serving packet radio support node inserts into a message informing the digital cellular radio network of the detach, an indication of the fact that the mobile station could not be reached, and the digital cellular radio network marks in the digital cellular radio network's register that the mobile station could not be reached in response to receipt of said indication.

13. A cellular packet radio system, comprising:

at least one mobile station that can be simultaneously attached to a packet radio network and a cellular radio network, at least one packet radio support node connected to a digital cellular radio network offering to said at least one packet radio support node a radio interface for packet-switched data transfer with said at least one mobile station, at least one home location register storing information on which networks the mobile station is attached to, wherein the support node of the packet radio network sends information to the digital cellular radio network when the mobile station becomes attached to the digital cellular radio network through the support node, and the digital cellular radio network, in response to receipt of said information from the packet radio support node, clears the indication possibly held in its registers on the fact that the mobile station could not be reached and not to send to the home location register an indication of the attach of the mobile station to the cellular radio network.

14. A cellular packet radio system, comprising:

at least one mobile station that can be simultaneously attached to a packet radio network and a cellular radio network, at least one packet radio support node connected to a digital cellular radio network offering to said at least one packet radio support node a radio interface for packet-switched data transfer with said at least one mobile station, at least one home location register storing information on which networks the mobile station is attached to, wherein the support node of the packet radio network sends a message to the digital cellular radio network when the mobile station becomes attached to the digital cellular radio network through the support node, said message containing information on the fact that the indication possibly held in the registers of the digital cellular radio network of the fact that the mobile station could not be reached is to be cleared, and the digital cellular radio network, in response to receipt of said information from the packet radio support node, clears the indication possibly held in its registers of the fact that the mobile station could not be reached and not to send to the home location register an indication of the attach of the mobile station to the cellular radio network.

15. A cellular packet radio system, comprising at least one mobile station, at least one packet radio support node connected to a digital cellular radio network offering to said at least one support node a radio interface for packet-switched data transfer with said at least one mobile station, at least one gateway mobile switching center for short message service connected to the packet radio support node and to the digital cellular radio network for delivery of short messages to the at least one mobile station, at least one home location register for maintaining routing addresses and subscriber data for mobile stations, the home location register gives the address of the packet radio network and the address of the cellular radio network in response to a mobile-terminated short message routing information inquiry when the mobile station is attached to both networks, the home location register gives only the address of the packet radio network or the address of the cellular radio network in response to a mobile-terminated short message routing information inquiry when the mobile station is attached to the packet radio network or to the cellular radio network only, the gateway mobile switching center for short message service delivers a mobile-terminated short message primarily through the serving packet radio support node of the packet radio network using the address of the packet radio network, if the home location register gives both addresses, the gateway mobile switching center for short message service delivers a mobile-terminated short message through the packet radio network or through the cellular radio network only, if the home location register gives the address of the packet radio network or the address of the cellular radio network only, wherein if the packet radio support node does not succeed in delivering the short message to the mobile station, the packet radio support node inserts into the failure report message sent to the gateway mobile switching center for short message service an indication of the fact that the mobile station cannot be reached through the packet radio network, the gateway mobile switching center for short message service, in response to said indication, inserts the same indication to the delivery report message sent to the home location register, and the home location register is adapted, in response to receipt of said indication, to store said indication in its registers, the home location register gives, in response to a routing information inquiry, the address of the digital cellular radio network only when said indication is stored in the subscriber data for the mobile station, even though the mobile station were attached to both networks.

16. A cellular radio network, comprising:

a primary network offering a first data transfer route, at least one network node in the primary network, a secondary network offering a second data transfer route, at least one mobile station that can be simultaneously attached to the primary network and to the secondary network, at least one gateway mobile switching center for short message service connected to the primary network and to the secondary network for delivery of short messages to the mobile stations, at least one home location register for maintaining routing addresses and subscriber data for mobile stations, the home location register gives the address in the primary network and optionally the address in the secondary network in response to a mobile-terminated short message routing information inquiry when the mobile station is attached to both networks, the home location register gives only the address in the primary network or the address in the secondary network in response to a mobile-terminated short message routing information inquiry when the mobile station is attached to the primary network or to the secondary network only, the gateway mobile switching center for short message service delivers a mobile-terminated short message primarily through the network node of the primary network using the address in the primary network, if the home location register gives both addresses, the gateway mobile switching center for short message service delivers a mobile-terminated short message through the primary network or only through the secondary network, if the home location register gives the address of the primary network or only the address of the secondary network, wherein if the network node does not succeed in delivering the short message to the mobile station, the network node inserts into the failure report message sent to the gateway mobile switching center for short message service an indication of the fact that the mobile station cannot be reached through the primary network, the gateway mobile switching center for short message service, in response to said indication, inserts the same indication into the delivery report message sent to the home location register, and the home location register, in response to receipt of said indication, stores said indication in its registers, the home location register gives, in response to a routing information inquiry, the address of the secondary network only when said indication is stored in the subscriber data for the mobile station, even though the mobile station were attached to both networks.

17. The cellular radio network as claimed in claim 16, wherein a network operator can determine which one of the networks is to be used as the primary network and which one as the secondary network.

18. A subscriber data base in a telecommunication system, which comprises:

two different networks capable of delivering short messages to a mobile station operating in the two networks, one of the networks being a primary network and the other one being a secondary network so that attempts to reach the mobile station are primarily made through the primary network first for delivering short messages to the mobile station, and the mobile station may be attached to the primary and secondary network simultaneously, the subscriber database comprising subscriber data, routing information and sending means for sending a response to a routing information request, wherein the subscriber database comprises memory means for maintaining reachability information on whether the mobile station is reachable through the primary network, and the sending means are responsive to reachability information and include into the response to the routing information request an address in the primary network and optionally an address in the secondary network, if the mobile station is reachable through the primary network, or an address in the secondary network, if the mobile station is not reachable through the primary network.

19. A cellular packet radio system, comprising:

at least one mobile station, a digital cellular radio network offering a radio interface for data transfer with said at least one mobile station, at least one packet radio support node connected to the digital cellular radio network, at least one gateway mobile switching center for short message service connected to the packet radio support node and to the digital cellular radio network for delivery of short messages to the mobile station, at least one home location register for maintaining routing addresses for the mobile station, the gateway mobile switching center for short message service to deliver a mobile-terminated short message primarily through the serving packet radio support node of the packet radio network using the address of the packet radio network and to attempt retransmission of the short message through the digital cellular radio network in response to a failure report message received from the packet radio support node if the home location register gives both addresses, wherein if the packet radio support node does not succeed in delivering the short message to the mobile station, the packet radio support node inserts into said failure report message information preventing the gateway mobile switching center for short message service from retransmitting the short message through the digital cellular radio network and to send said failure report message to said gateway mobile switching center for short message service.

* * * * *